United States Patent
Byun et al.

(10) Patent No.: US 10,536,942 B2
(45) Date of Patent: Jan. 14, 2020

(54) METHOD AND DEVICE FOR COMMUNICATING USING WIRELESS FRAME IN TDD-BASED WIRELESS COMMUNICATION SYSTEM

(71) Applicant: LG ELECTRONICS INC., Seoul (KR)

(72) Inventors: Ilmu Byun, Seoul (KR); Heejeong Cho, Seoul (KR); Genebeck Hahn, Seoul (KR); Eunjong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/766,164

(22) PCT Filed: Oct. 5, 2016

(86) PCT No.: PCT/KR2016/011113
§ 371 (c)(1),
(2) Date: Apr. 5, 2018

(87) PCT Pub. No.: WO2017/069432
PCT Pub. Date: Apr. 27, 2017

(65) Prior Publication Data
US 2018/0288762 A1    Oct. 4, 2018

Related U.S. Application Data

(60) Provisional application No. 62/243,120, filed on Oct. 18, 2015.

(51) Int. Cl.
*H04W 72/04* (2009.01)
*H04B 7/26* (2006.01)
(Continued)

(52) U.S. Cl.
CPC .......... *H04W 72/0446* (2013.01); *H04B 7/26* (2013.01); *H04L 5/0048* (2013.01);
(Continued)

(58) Field of Classification Search
None
See application file for complete search history.

(56) References Cited

U.S. PATENT DOCUMENTS

2014/0341091 A1* 11/2014 Ji ........................... H04L 5/1469
370/280
2015/0110011 A1    4/2015 Wei
(Continued)

FOREIGN PATENT DOCUMENTS

WO    2014112850    7/2014
WO    2015053584    4/2015
(Continued)

OTHER PUBLICATIONS

PCT International Application No. PCT/KR2016/011113, Written Opinion of the International Searching Authority dated Jan. 17, 2017, 4 pages.

(Continued)

*Primary Examiner* — Diane L Lo
(74) *Attorney, Agent, or Firm* — Lee, Hong, Degerman, Kang & Waimey

(57) ABSTRACT

A method and a device for communicating using a wireless frame in a TDD-based wireless communication system are provided. Specifically, a first indicator indicating a first DL and UL subframe configuration and a second indicator indicating a second DL and UL subframe configuration for a wireless frame are received. Information on a third DL and UL subframe configuration for the wireless frame, determined by the first and second indicators, is received. A portion of the third DL and UL subframe configuration is determined by the second indicator, and the remaining portion of the third DL and UL subframe configuration is determined by the first indicator. According to the third DL and UL subframe configuration, a downlink signal is received and an uplink signal is transmitted.

10 Claims, 10 Drawing Sheets

(51) Int. Cl.
*H04L 5/00* (2006.01)
*H04L 5/14* (2006.01)
*H04W 72/12* (2009.01)

(52) U.S. Cl.
CPC .......... *H04L 5/0053* (2013.01); *H04L 5/0055* (2013.01); *H04L 5/0073* (2013.01); *H04L 5/14* (2013.01); *H04L 5/1469* (2013.01); *H04W 72/0406* (2013.01); *H04W 72/1205* (2013.01); *H04L 5/0044* (2013.01); *H04L 5/0064* (2013.01)

(56) References Cited

U.S. PATENT DOCUMENTS

| | | |
|---|---|---|
| 2015/0271798 A1 | 9/2015 | Chen et al. |
| 2015/0289246 A1 | 10/2015 | Suzuki et al. |
| 2016/0057743 A1* | 2/2016 | Aiba ................ H04W 72/04 370/329 |
| 2016/0338048 A1* | 11/2016 | Aiba ................ H04W 72/00 |
| 2016/0344515 A1* | 11/2016 | Aiba ................ H04L 1/1812 |
| 2017/0086207 A1* | 3/2017 | Yokomakura ......... H04W 24/10 |

FOREIGN PATENT DOCUMENTS

| | | |
|---|---|---|
| WO | 2015126027 | 8/2015 |
| WO | 2015134907 | 9/2015 |

OTHER PUBLICATIONS

3rd Generation Partnership Project (3GPP), "Technical Specification Group Radio Access Network; Evolved Universal Terrestrial Radio Access (E-UTRA); Physical Channels and Modulation (Release 8)," 3GPP TS 36.211 V8.2.0, Mar. 2008, 65 pages.

European Patent Office Application Serial No. 16857690.8, Search Report dated Jun. 6, 2019, 12 pages.

* cited by examiner

METHOD AND DEVICE FOR COMMUNICATING USING WIRELESS FRAME IN TDD-BASED WIRELESS COMMUNICATION SYSTEM

CROSS-REFERENCE TO RELATED APPLICATIONS

This application is the National Stage filing under 35 U.S.C. 371 of International Application No. PCT/KR2016/011113, filed on Oct. 5, 2016, which claims the benefit of U.S. Provisional Application No. 62/243,120, filed on Oct. 18, 2015, the contents of which are all hereby incorporated by reference herein in their entirety.

BACKGROUND OF THE INVENTION

Field of the Invention

The present invention relates to wireless communication, and more particularly, to a method for performing communication using a radio frame in a TDD-based wireless communication system, and a device using the same.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a 3GPP LTE system, the time taken for control information or data user to be transmitted on a single subframe is a transmission time interval (TTI). In general, the length of a single subframe is 1 ms. However, a next-generation wireless communication system for responding to a change of a higher data rate and a faster channel environment attempts to achieve latency of 1 ms on a user plane. That is, a TTI having a length of 1 ms has a structure not suitable for low latency requirements in a next-generation wireless communication system. Accordingly, there is a need for a method for disposing a radio resource structure for satisfying lower latency by controlling a short TTI subdivided from the existing TTI.

SUMMARY OF THE INVENTION

The present invention provides a method and a device for performing communication using a radio frame in a TDD-based wireless communication system.

The present invention proposes a method of performing communication using a radio frame in a TDD-based wireless communication system.

First, according to the definitions of terms, a configuration of a downlink (DL) subframe and an uplink (UL) subframe denotes a configuration of subframes in a TDD-based radio frame.

A UE receives a first indicator indicating a first DL and UL subframe configuration for a radio frame and a second indicator indicating a second DL and UL subframe configuration for the radio frame. The first DL and UL subframe configuration may be set to a configuration according to the traffic ratio between DL and UL subframes, and the second DL and UL subframe configuration may be set in a TDD configuration for receiving a high-reliability and low-latency service.

Here, a first subframe of the radio frame may include at least one DL subframe, and a second subframe of the radio frame may include at least one UL subframe. That is, at least one DL subframe and at least one UL subframe may be fixedly disposed at particular subframe positions in the radio frame. When the radio frame includes N subframes, the first subframe is an initial subframe of the radio frame, and the second subframe is the [N/2]+1th subframe of the radio frame. That is, a DL subframe may be disposed in the first subframe of the radio frame, and a UL subframe may be disposed in the [N/2]+1th subframe of the radio frame. Here, the second indicator is received through the first subframe. When the second indicator is transmitted via the foremost subframe of the radio frame, the UE may utilize configuration information about the radio frame indicated by the second indicator. Also, the UE may obtain processing time for not performing uplink transmission accordingly.

The second indicator may indicate the second DL and UL subframe configuration for the same radio frame through which the second indicator is received.

The second indicator may be received once more via a third subframe after the first subframe and before the second subframe. When the second indicator is transmitted twice, the reliability of the second indicator may be increased or the frequency of changing the second indicator may be increased, thereby stably applying a high-reliability and low-latency service. The second indicator additionally received via the third subframe may indicate a fourth DL and UL subframe configuration for a radio frame following the radio frame. Accordingly, the second indicator transmitted at the second time in the radio frame indicates the configuration for the following radio frame, thus canceling a resource previously scheduled for a UL subframe of the following radio frame. Here, it is assumed that the interval between a DL subframe and a UL subframe in the radio frame is narrow.

The maximum allocation period of the DL subframe in the second DL and UL subframe configuration is set to be equal to the number of subframes in the radio frame. When the maximum allocation period of the DL subframe is equal to the number of subframes in the radio frame, radio frames can have the same number of DL subframes, thus adjusting a desired ratio between DL subframes and UL subframe according to the indicator.

The first and second indicators indicate that the at least one DL subframe is disposed in the first subframe and the at least one UL subframe is disposed in the second subframe for a serving cell. That is, as described above, the first and second indicators indicate that at least one DL subframe and at least one UL subframe are fixedly disposed at particular subframe positions in the radio frame. Here, the second indicator also indicates that at least one DL subframe is disposed in the first subframe and at least one UL subframe is disposed in the second subframe for a neighboring cell adjacent to the serving cell. That is, information on the second indicator is exchanged between neighboring cells, and at least one DL subframe and at least one UL subframe are fixedly disposed at the same particular subframe positions for the neighboring cells, thereby preventing interference in the UE. In other words, it is possible through the second indicator to secure a DL subframe and a UL subframe that do not cause interference between the serving cell and the neighboring cell.

The UE receives information on a third DL and UL subframe configuration for the radio frame indicated by the first and second indicators. The third DL and UL subframe configuration is first determined according to the second DL and UL subframe configuration indicated by the second indicator. Subsequently, a DL and UL subframe configuration not indicated by the second indicator in the third DL and UL subframe configuration is determined according to the first DL and UL subframe configuration indicated by the first indicator. That is, part of the third DL and UL subframe configuration is determined according to the second DL and UL subframe configuration, and the remaining part of the third DL and UL subframe configuration is determined according to the first DL and UL subframe configuration. That is, the configuration indicated by the second indicator is preferentially applied to the configuration indicated by the first indicator. Therefore, the second indicator may be received with a shorter period than the first indicator, thereby quickly changing a configuration of subframes for receiving a high-reliability and low-latency service.

The UE receives a downlink signal according to the determined third DL and UL subframe configuration. That is, communication may be performed by applying the third DL and UL subframe configuration to the radio frame.

The UE transmits an uplink signal according to the determined third DL and UL subframe configuration.

Here, the radio frame may be transmitted every TTI, and the DL and UL subframes may be transmitted every sTTI set to be shorter than the TTI. Accordingly, a radio transmission delay of 1 ms may be satisfied in receiving a signal and transmitting a response signal thereto.

The present invention proposes a UE (device) for performing communication using a radio frame in a TDD-based wireless communication system.

First, according to the definitions of terms, a configuration of a downlink (DL) subframe and an uplink (UL) subframe denotes a configuration of subframes in a TDD-based radio frame.

The UE includes: an RF unit to transmit and receive a radio signal; and a processor connected to the RF unit. The processor of the UE receives a first indicator indicating a first DL and UL subframe configuration for a radio frame and a second indicator indicating a second DL and UL subframe configuration for the radio frame. The first DL and UL subframe configuration may be set to a configuration according to the traffic ratio between DL and UL subframes, and the second DL and UL subframe configuration may be set in a TDD configuration for receiving a high-reliability and low-latency service. Here, a first subframe of the radio frame may include at least one DL subframe, and a second subframe of the radio frame may include at least one UL subframe.

The processor receives information on a third DL and UL subframe configuration for the radio frame indicated by the first and second indicators. The third DL and UL subframe configuration is first determined according to the second DL and UL subframe configuration indicated by the second indicator. Subsequently, a DL and UL subframe configuration not indicated by the second indicator in the third DL and UL subframe configuration is determined according to the first DL and UL subframe configuration indicated by the first indicator. That is, part of the third DL and UL subframe configuration is determined according to the second DL and UL subframe configuration, and the remaining part of the third DL and UL subframe configuration is determined according to the first DL and UL subframe configuration.

The processor receives a downlink signal according to the determined third DL and UL subframe configuration. Further, the processor transmits an uplink signal according to the determined third DL and UL subframe configuration.

According to a technique proposed in the present invention, it is possible to realize a wireless communication system employing a TDD radio frame structure capable of providing both a mobile broadband service and a high-reliability and low-latency service. In this wireless communication system, it is also possible to reduce signaling overheads between a BS and a UE as well as signaling overheads between BSs. Further, according to the frame structure proposed in the present invention, a subframe causing no uplink interference in a downlink may be always secured, thereby stably providing a high-reliability and low-latency service.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE. However, technical features of the present invention are not limited thereto.

Figure 1:
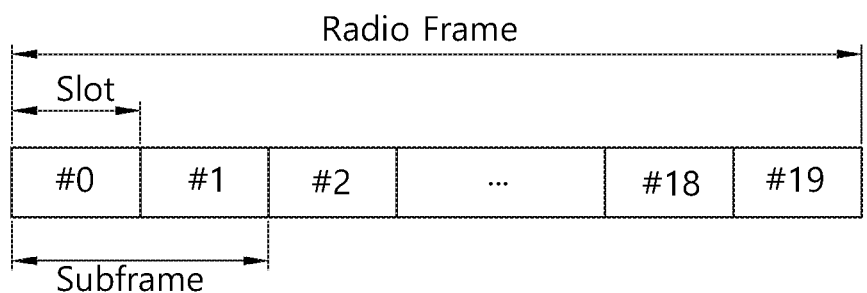
FIG. 1 shows a structure of a radio frame in 3GPP LTE.

FIG. 1 shows a structure of a radio frame in 3GPP LTE.

Referring to FIG. 1, the radio frame consists of 10 subframes. One subframe consists of 2 slots. The slots in the radio frame are numbered from slot number 0 to 19. A time required for transmitting one subframe is defined as a transmission time interval (TTI). The TTI is a unit of scheduling for transmitting a data. For example, one subframe may have a length of 1 millisecond (ms), and one slot may have a length of 0.5 ms.

The structure of the radio frame is for exemplary purposes only, and the number of subframes included in the radio frame or the number of slots included in the subframe and the number of SC-FDMA symbols included in the slot can change variously.

Figure 2:
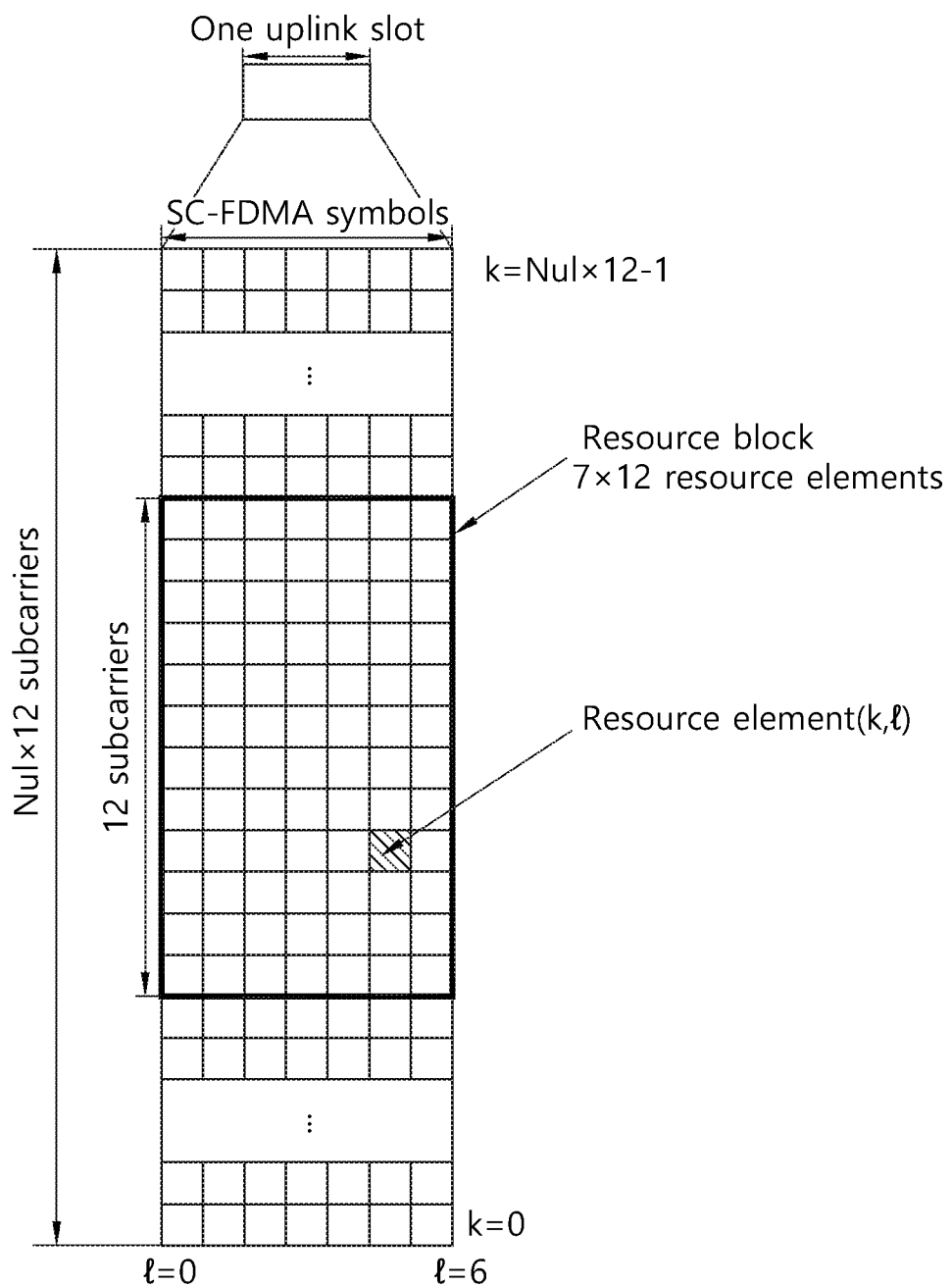
FIG. 2 is a diagram showing an example of a resource grid for one uplink slot in 3GPP LTE.

FIG. 2 is a diagram showing an example of a resource grid for one uplink slot in 3GPP LTE.

Referring to FIG. 2, The UL slot includes a plurality of SC-FDMA symbols in a time domain and includes a plurality of $N^{UL}$ RBs in a frequency domain. It is described that the SC-FDMA symbols are for representing one symbol period, and the SC-FDMA symbols can be OFDM symbols or symbol period according to the system. The RBs are a unit of resource allocation in the frequency domain and include 12 subcarriers. The number $N^{UL}$ of RBs included in the UL slot depends on a UL bandwidth defined in a cell. The UL bandwidth is system information. The UE may know $N^{UL}$ by acquiring the system information.

Each element on the resource grid is referred to as a resource element. One RB includes 12×7 resource elements. The resource element on the resource grid can be identified by an index pair (k, l) within the slot. Herein, k(k=0, . . . , $N^{UL}$×12−1) denotes a subcarrier index in the frequency domain, and l(l=0, . . . , 6) denotes an SC-FDMA symbol index in the time domain.

Although it is described herein that one RB includes 7×12 resource elements consisting of 7 SC-FDMA symbols in the time domain and 12 subcarriers in the frequency domain for example, the number of SC-FDMA symbols and the number of subcarriers in the RB are not limited thereto. Thus, the number of subcarriers or the number of SC-FDMA symbols included in the RB may change variously. The number of SC-FDMA symbols may change depending on a cyclic prefix (CP) length. For example, when using a normal CP, the number of SC-FDMA symbols included in one slot is 7, and when using an extended CP, the number of SC-FDMA symbols included in one slot is 6.

In 3GPP LTE of FIG. 2, a resource grid for a single uplink slot may also be applied to a resource grid for a downlink slot. In this case, the downlink slot includes a plurality of orthogonal frequency division multiplexing (OFDM) symbols in a time domain.

Figure 3:
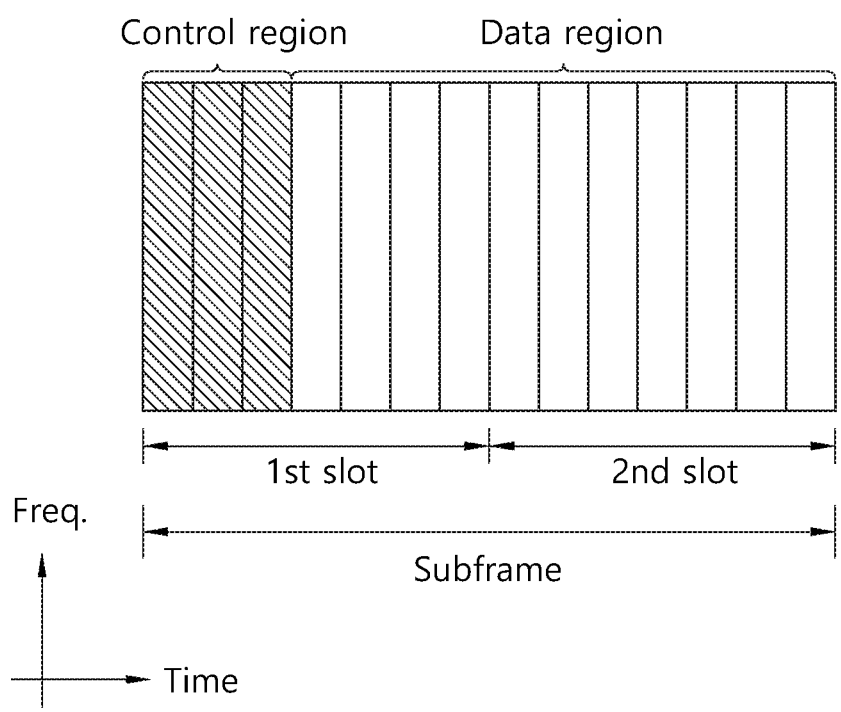
FIG. 3 shows an example of a structure of a downlink subframe in 3GPP LTE.

FIG. 3 shows an example of a structure of a downlink subframe in 3GPP LTE.

Referring to FIG. 3, a downlink subframe includes two contiguous slots. In the first slot of the downlink subframe, a maximum of the former three OFDM symbols become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid-ARQ indicator channel (PHICH), in addition to a PDCCH may be allocated to the control region. In this case, the inclusion of the three OFDM symbols in the control region is only an example. The number of OFDM symbols included in the control region of a subframe may be aware through a PCFICH. A PHICH carries hybrid automatic repeat request (HARQ) acknowledgement (ACK)/not-acknowledgement (NACK) information as a response to uplink data transmission.

A PDCCH may carry a downlink grant that provides notification of the resource allocation of downlink transmission on a PDSCH. UE may read downlink user data transmitted through a PDSCH by decoding control information transmitted through the PDCCH. Furthermore, the PDCCH may carry control information, used for physical uplink shared channel (PUSCH) scheduling, to the UE. The control information used for PUSCH scheduling is an uplink grant that provides notification of the resource allocation of uplink transmission.

A control region consists of an aggregation of a plurality of control channel elements (CCEs). A PDCCH is transmitted on an aggregation of one or some contiguous CCEs. A CCE corresponds to a plurality of resource element groups. A resource element group is used to define the mapping of a control channel to a resource element. In a downlink subframe, if a total number of CCEs is $N_{cce}$, CCE indices of 0 to $N_{cce}$,k−1 are assigned to CCEs. A total number of CCEs within a subframe may also be different in each subframe because the number of OFDM symbols included in a control region within a subframe may be different in each subframe.

Hereinafter, a subframe consisting of N (>=1) OFDM symbols is defined, and a specific radio frame structure in which M (>=0) subframes and P (>=0) special symbols (s-symbols) for a control physical signal or a control information transport channel are bundled is described. This shows a specific radio frame structure designed differently from the example in which 14 contiguous OFDM symbols illustrated in FIG. 1 become one subframe and 10 subframes have one radio frame structure.

Data, a control physical signal, and control information may be transmitted in a subframe, and a control physical signal and control information other than data may be transmitted in a special symbol. Such a time section resource transmission structure may be designated in a UE unit or may be designated so that it is in common applied to all of pieces of UE in a cell or system. At the same time, a transmission structure may be limitedly designated so that it is applied depending on a time or frequency band (subband). If the time section resource transmission structure is designated in a UE unit, UE may be notified of such designation using a UE-specific downlink physical control channel or UE-specific RRC signaling. In the case of the UE-common designation of a BS or network, UE may be notified of the designation using a UE-common downlink physical control channel or UE-common RRC signaling as system information.

Figure 4:
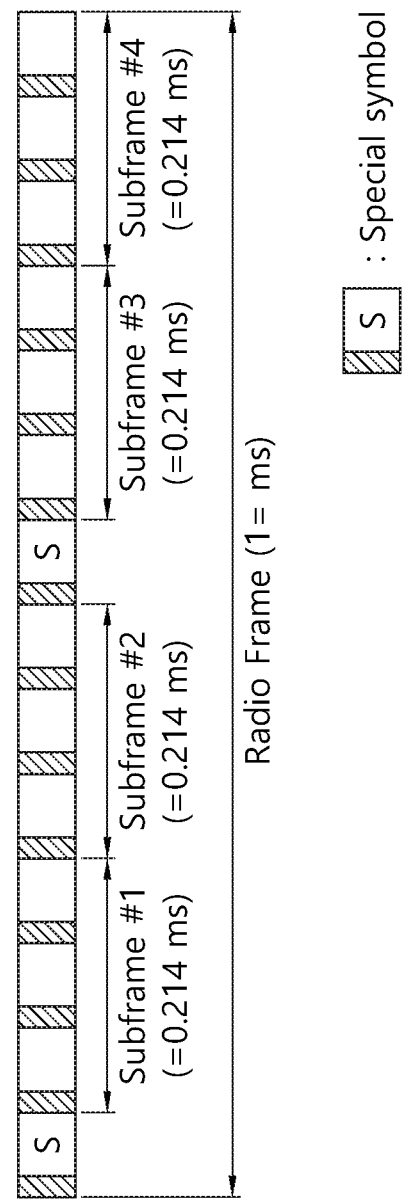
FIG. 4 shows the structure of a radio frame including subframes and special symbols.

FIG. 4 shows the structure of a radio frame including subframes and special symbols.

FIG. 4 illustrates a time section transmission resource structure in which three OFDM symbols (N=3) form a single subframe and four subframes (M=4) and two special symbols (P=2) define a radio frame of 1 ms in length. The length of each subframe is 0.214 ms.

In this case, special symbols within the radio frame may be disposed at equal distances, may be disposed only at a specific location, or may be irregularly disposed. If the role of special symbols is for measurement, detection or the transfer of information, the special symbols may be disposed at equal distances. Special symbols may be irregularly disposed depending on the number of pieces of UE within a cell or a channel characteristic. Some examples in which a special symbol is disposed are described below.

Figure 5:
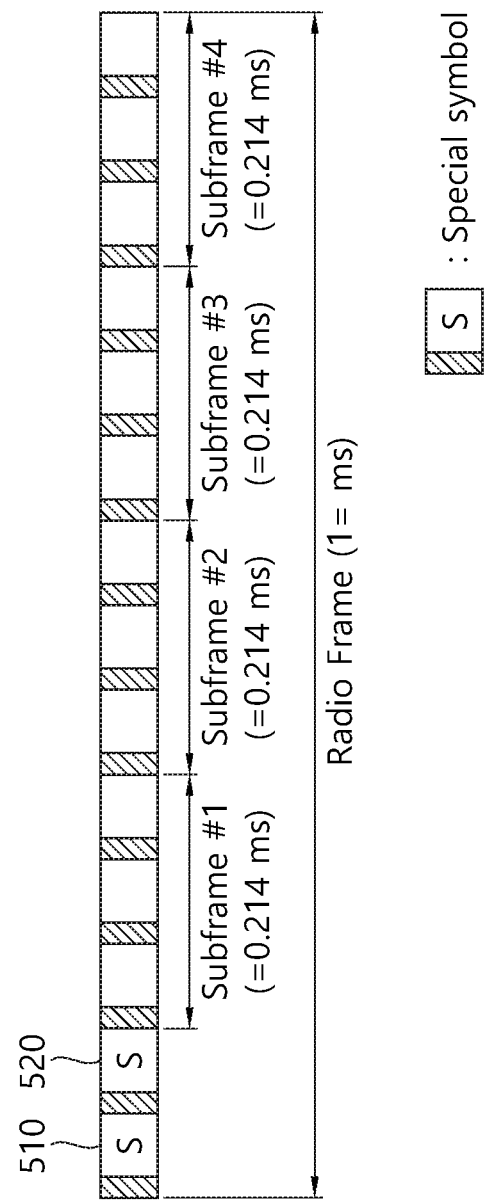
FIG. 5 shows an example of the structure of a radio frame in which special symbols have been contiguously disposed at the front part of the radio frame.
Figure 6:
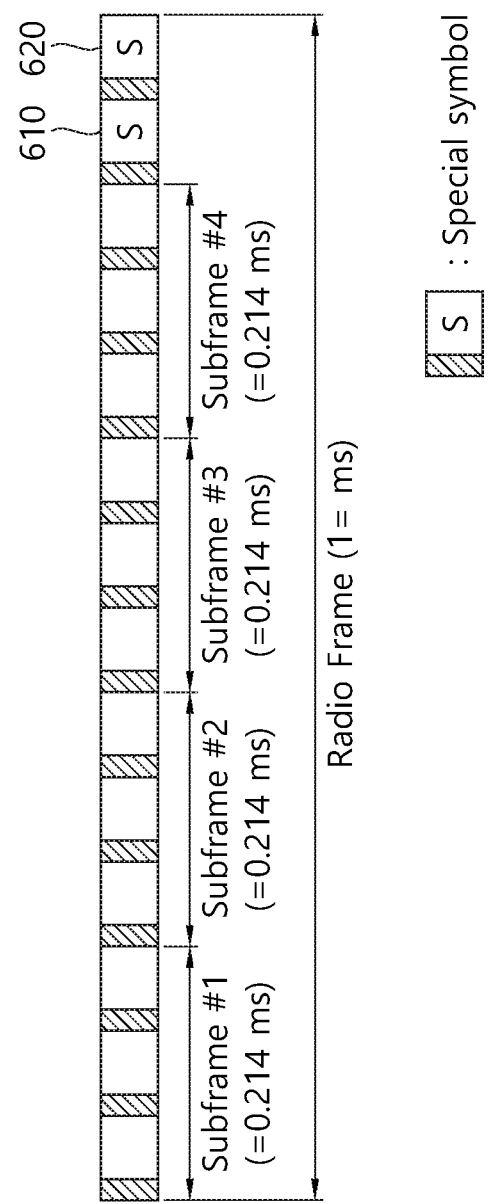
FIG. 6 shows an example of the structure of a radio frame in which special symbols have been contiguously disposed at the back part of the radio frame.

FIG. 5 shows an example of the structure of a radio frame in which special symbols have been contiguously disposed at the front part of the radio frame. FIG. 6 shows an example of the structure of a radio frame in which special symbols have been contiguously disposed at the back part of the radio frame. FIG. 5 shows a transmission resource structure in which special symbols 510 and 520 are contiguously disposed in symbols that are temporally the first two on the radio frame. FIG. 6 shows a transmission resource structure in which special symbols are contiguously disposed in symbols 610 and 620 that are temporally the last two on the radio frame.

In this specification, in the time section transmission resource structure, the locations of special symbols in each radio frame may be different in a radio frame unit or a plurality of radio frame units. If one or a plurality of special symbol is periodically disposed in a radio frame unit, the locations of special symbol in a corresponding cycle may be patterned, and an index may be assigned to the pattern. Alternatively, a BS may notify UE of control information about a bitmap form in a radio frame unit through RRC signaling, may transfer the control information to the UE through a downlink physical data channel using an MAC control element (CE), or may transfer the control information to the UE through a downlink physical control channel.

In this specification, the time section transmission resource structure is specified in a UE unit in frequency division duplex (FDD). Alternatively, the time section transmission resource structure may be applied to both a downlink transmission band and an uplink transmission band or only one of a downlink transmission band and an uplink transmission band with respect to all of pieces of UE within a cell.

Likewise, the time section transmission resource structure may be specified in a UE unit in time division duplex (TDD) or full duplex using specific radio resources for uplink/downlink transmission. Alternatively, the time section transmission resource structure may be applied to both downlink transmission time resources and uplink transmission time resources or only one of downlink transmission time resources and uplink transmission time resources with respect to all of pieces of UE within a cell. From a viewpoint of an uplink/downlink time section resource configuration of TDD, a method for designating downlink transmission resources and uplink transmission resources in a radio frame unit may be applied to the time section transmission resource structure. Alternatively, a method for designating downlink transmission resources and uplink transmission resources in a subframe unit within a radio frame may be applied to the time section transmission resource structure.

That is, in this specification, the time section transmission resource structure is provided on the basis that it may be independently applied to uplink/downlink transmission resources using parameters independently on a physical control channel or RRC signaling. Furthermore, if only a method for simultaneously applying uplink transmission and downlink transmission is used depending on a method for applying a system, the time section transmission resource structure may be applied in common simultaneously using a single parameter on a physical control channel or RRC signaling.

In this specification, the time section transmission resource structure defines a special symbol within a radio frame independently of a subframe. In this case, the special symbol may be used to transmit special cell-common or UE-specific control information. Furthermore, the special symbol may be used to transmit a special cell-common or UE-specific physical signal (e.g., a pilot, a reference signal or a synchronization signal) for the purpose of the measurement or detection of UE. Possible examples of a signal or control information that is transmitted in the special symbol are described below in the case of downlink and uplink.

1. Downlink (1) Transmission of Physical Downlink Control Channel (PDCCH)

A BS transmits a PDCCH, including UE-common control information or pieces of UE-specific control information required to be transmitted from the BS or a specific network radio node to UE through downlink, to the UE through a special symbol. The UE may receive a physical channel, that is, the object of the special symbol. In this case, the PDCCH is basically designed on a frequency resource on a single special symbol, but may be designed on a plurality of symbols resources and frequency resources if a plurality of special symbols is used.

(2) Transmission of Downlink Synchronization Signal

A BS may transmit a downlink synchronization physical signal transmitted so as to obtain the downlink reception synchronization of UE through one or more special symbols. For example, in 3GPP LTE, a primary synchronization signal (PSS) and a secondary synchronization signal (SSS) become the object of a downlink synchronization physical signal. If such a method is applied, the location of a special symbol used to the corresponding object within a specific defined radio frame on time section resources may be designated in a UE-common manner. Furthermore, a BS and UE permanently designate the location of a special symbol without separate signaling.

(3) Transmission of Downlink Channel Measurement Pilot (or Reference Signal)

For the purpose of system downlink control including the support of a determination of the time-frequency resource configuration and transmission method of a packet scheduler adaptive to a radio channel on a radio packet transmission system, a downlink channel measurement pilot is transmitted through one or more special symbols defined separately from a UE data channel transmission time section. Furthermore, UE performs radio channel measurement using a corresponding pilot through a corresponding special symbol. This method may be used as a method for preventing the deterioration of data transmission performance generated because resources for transmitting the existing data channel are excessively used to transmit a pilot signal if a technology in which downlink transmission is performed using a large number of transmission antennas, such as massive MIMO, is used in a mobile communication system. In this case, the massive MIMO may be defined as a transmission method using 16 or more transmission antennas. It is assumed that a downlink channel measurement pilot is transmitted using a plurality of special symbols. In this case, in addition to the multiplexing method of a multiple pilot resource pattern using a basic TDM, FDM method, the multiplexing method of a multiple pilot resource pattern using a CDM method through the application of time section orthogonal code or frequency section orthogonal code may be applied.

(4) Use of Interference Signal Measurement by UE

An operation of allowing UE to measure a downlink reception interference signal of another network radio node or UE other than a network radio node (or BS) that provides service through one or more special symbols may be defined. As a first example, a specific network radio node (or BS) excludes the transmission of a radio signal in all of subcarrier resources or some designated subcarrier resources included in a special symbol on time section transmission resources that are to be used for transmission by the specific network radio node (or BS). Furthermore, UE that is provided with service from a corresponding network radio node may use a method for receiving a specific signal (it may be defined as a pilot or reference signal) of adjacent network radio nodes (or BSs) through the corresponding symbol. In this case, a special symbol transmission signal on a plurality of network radio nodes may be defined as a pilot (or reference signal) for downlink channel measurement. Furthermore, in order to exclude the transmission of a radio signal, all of subcarrier resources within a specific pilot pattern or a corresponding symbol may be specially defined as a null power pilot. As a second example, an operation for the UE interference measurement of the first example may be applied in a situation in which a serving network radio node also transmits a signal by applying a specific resources pattern of a specific pilot (or reference signal) of a specific channel may also be applied.

(5) Transmission of Downlink ACK/NACK Signal for Uplink Data

A downlink ACK/NACK signal for transmitting uplink data is defined as a physical channel on a specific special symbol. A network radio node (or a BS) that receives the uplink data transmits the downlink ACK/NACK signal through the corresponding special symbol. A correction mechanism operation for detecting an error of a system physical layer may be defined so that UE that transmits the uplink data receives the downlink ACK/NACK signal through the corresponding special symbol.

(6) Transmission of Downlink Massive MIMO Beam Scanning Signal

In this specification, a radio network node (or a BS) adopting a time section transmission resource structure also applies a downlink transmission method of massive MIMO. In this case, an operation for transmitting, by a network radio node (or a BS), the transmission of a signature, pilot or reference signal for supporting the UE beam tracking of massive MIMO in a specific cycle through a special symbol and receiving, by UE, the signature, pilot or reference signal through a corresponding special symbol may be defined as applied.

2. Uplink (1) Transmission of an Uplink Synchronization Signal

A method for designing the uplink synchronization signal (e.g., a physical random access channel (PRACH) preamble in 3GPP LTE) of UE in the length of one or a plurality of special symbols and transmitting the uplink synchronization signal may be applied in a situation in which this time section transmission resource structure is applied as an uplink transmission frame structure.

(2) Transmission of Uplink Channel Sounding Signal

An uplink channel sounding signal of UE may be designated to be transmitted through a special symbol on the time section transmission resource structure. If a network radio node (or a BS) instructs the uplink channel sounding signal to be transmitted, a UE-specific uplink data transmission grant at a specific point of time prior to a corresponding special symbol by a designated length (it may be designated in a radio frame or subframe unit) may be triggered in a PDCCH using in a channel sounding transmission indicator. In some embodiments, a UE-specific uplink data transmission grant may be designated using an RRC parameter and signaled to UE when a periodical channel sounding signal is transmitted. In both the methods, a point of time at which the transmission of a UE-specific channel sounding signal is attempted and a resource configuration may be previously designated using an RRC parameter and signaled to UE.

(3) Transmission of Physical Uplink Control Channel (PUCCH)

In a situation in which the time section transmission resource structure is applied as an uplink transmission frame structure, a method for transmitting uplink control information of specific UE through a PUCCH designed on one or a plurality of special symbols may be applied. In this case, the uplink control information of UE may be defined as follows.

Uplink scheduling request information according to a change of the transmission buffer state of UE (data arrival)

Downlink channel measurement information of UE

ACK/NACK information for the reception of downlink data by UE

The type of uplink physical control channel transmitted through one or a plurality of special symbols may be designated by taking into consideration the requirement information about of the above-described uplink control information, that is, a bit size. The type basically includes the following two schemes.

Scheme #1: A method for defining one PUCCH supporting an error generation restriction condition that is required for each piece of information on a bit size of uplink control information of a wide range and being applied to control information cases in common.

Scheme #2: A method for defining an individual PUCCH(s) supporting a maximum size of control information bit and an error requirement condition of corresponding information for each piece of control information in the case where a difference between the bit size of individual uplink control information and a required error generation rate restriction condition is defined to be large and transmitting the individual PUCCH(s) through one or a plurality of special symbols.

(4) Utilization of Interference Signal Measurement by UE

An operation for allowing a network radio node (or a BS) to measure the uplink reception interference signal of another network radio node or UE through one or more special symbols may be defined. As a detailed example, a plurality of pieces of specific UE or a specific network radio node (or a BS) may be designated to transmit a special pilot (or reference signal or signature), that is, an object of interference measurement, using a special symbol. In this case, the specific radio network node (or the BS) may check a surrounding interference situation by receiving and detecting such signals. In this case, the transmission of a corresponding pilot through special symbols of pieces of UEs that are to be received by the specific network radio node (or the BS) through uplink may be excluded. Furthermore, for such a purpose, all of subcarrier resources within a specific pilot pattern or a corresponding symbol may be specially defined as a null power pilot.

A next generation wireless communication system aims to satisfy a user plane latency of 1 ms in order to provide a lower latency service. The user plane latency includes not only the existing TTI length but also an encoding time and a decoding time. The user plane latency in a 3GPP LTE system is about 4.8 ms (encoding time=decoding time=1.5 ms, the existing TTI length=1 ms, target BLER=10%).

In this case, if a sTTI reduced from the existing TTI has a length of 1 to 3 OFDM symbols, the user plane latency may be achieved as 1 ms. That is, in order to achieve the user plane latency of 1 ms, the sTTI must have a length less than or equal to 3 OFDM symbols. If the user plane latency is less than or equal to 1 ms, the existing TTI must be about 1/4.8=0.21 ms. However, ever since the sTTI has a length of 4 OFDM symbols, the user plane latency cannot be achieved as 1 ms. This is because the sTTI is greater than or equal to 0.28 ms ever since the number of OFDM symbols is 4. Herein, it is assumed that the encoding/decoding time is also decreased proportionally in association with a decreased TTI.

Figure 7:
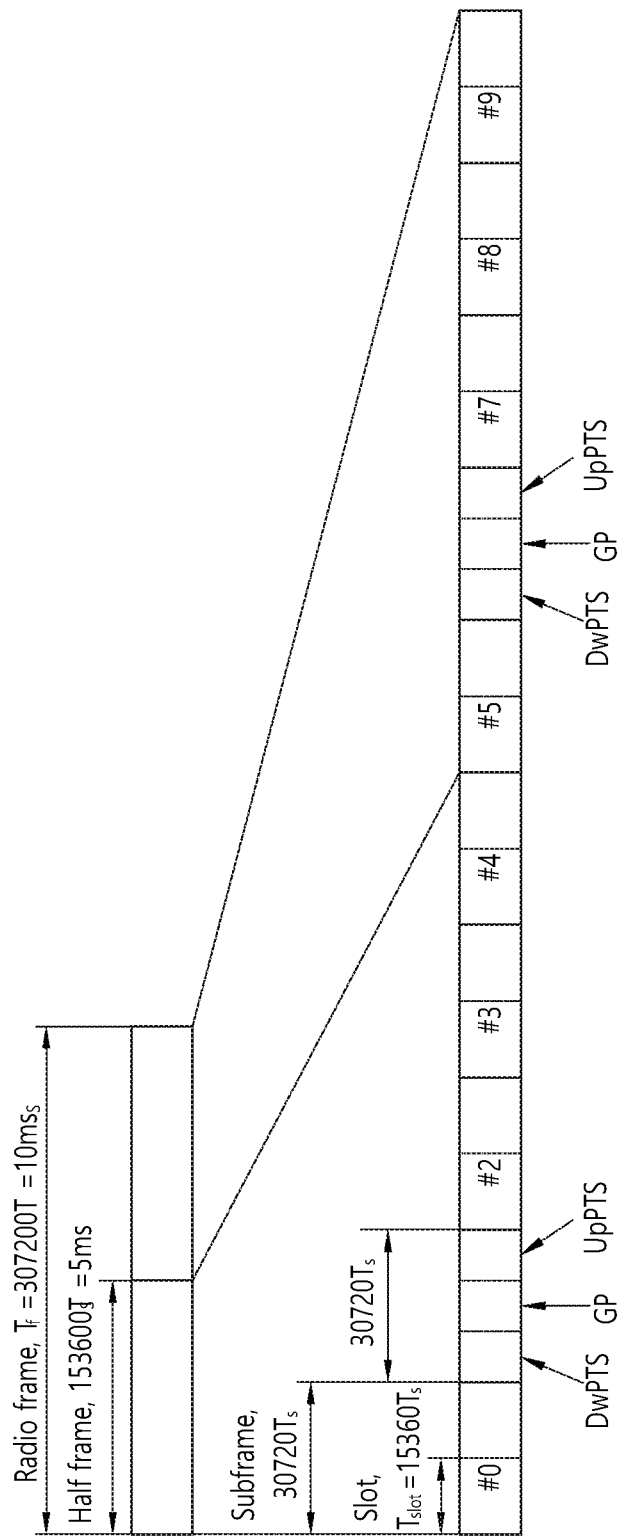
FIG. 7 shows the structure of a TDD radio frame in a 3GPP LTE system.

FIG. 7 shows the structure of a TDD radio frame in a 3GPP LTE system. For more detail, reference may be made to section 4.2 of 3GPP TS 36.211 V8.2.0 (2008-03) "Technical Specification Group Radio Access Network; Evolved Universal Terrestrial Radio Access (E-UTRA); Physical Channels and Modulation (Release 8)". One radio frame has a length of 10 ms and is configured of two half-frames each having the length of 5 ms. Also, one half-frame is configured of 5 subframes each having the length of 1 ms. Herein, one subframe is divided into 2 slots. One subframe is designated as any one of an uplink subframe (UL subframe), a downlink subframe (DL subframe), and a special subframe. One radio frame includes at least one uplink subframe and at least one downlink subframe.

One slot includes a plurality of Orthogonal Frequency Division Multiplexing (OFDM) symbols in a time domain and a plurality of subcarriers in a frequency domain. An OFDM symbol is used to express one symbol period, since the 3GPP LTE uses OFDMA in a downlink. And, therefore, the OFDM symbol may also be referred to as a different term in accordance with the multiplexing access method. For example, in case SC-FDMA is used as an uplink multiplexing access method, the OFDM symbol may be referred to as a SC-FDMA symbol. A resource block (RB) includes a plurality of consecutive (or contiguous) subcarriers within one slot in resource allocation units. However, the structure of the radio frame is merely exemplary. And, therefore, the number of subframes included in a radio frame, the number of slot included in a subframe, or the number of OFDM symbols included in a slot may be diversely varied.

It is defined in 3GPP LTE that one slot includes 7 OFDM symbols in a normal cyclic prefix (CP) and that one slot includes 6 OFDM symbols in an extended CP.

A special subframe is a special period that separates the uplink frame the downlink between an uplink subframe and a downlink subframe. At least one special frame exists in a radio frame, and a special frame includes a Downlink Pilot Time Slot (DwPTS), a Guard Period (GP), and an Uplink Pilot Time Slot (UpPTS). The DwPTS is used for initial cell search, synchronization, or channel estimation. The UpPTS is used for channel estimation by the base station and for establishing uplink transmission (or transport) synchronization of a user equipment. The GP is a guard period for eliminating (or removing) interference that may occur in an uplink due to a multi-path delay (or latency) of a downlink signal between an uplink and a downlink.

Table 1 indicates the structure of a radio frame that can be configured in accordance with the uplink subframe and downlink subframe alignment in a 3GPP LTE TDD system.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' indicates a downlink subframe, 'U' indicates an uplink subframe, and 'S' indicates a special subframe. The special subframe indicates a switching point, i.e., DwPTS+GP+UpPTS. Configurations 0~2 and 6 represent configurations wherein the downlink and the uplink changes at a switching point period (or downlink-to-uplink switch-point periodicity) of 5 ms. At this point, the special subframe exists in both of the 2 half-frames. Configurations 3~5 represent configurations wherein the downlink and the uplink changes at a switching point period of 10 ms. At this point, the special subframe exists only in a first half-frame ($1^{st}$ half-frame) among the 2 half-frames. Subframes 0 and 5 and the DwPTS of the special subframe are always allocated for the downlink transmission. And, the UpPTS of the special subframe and the subframe immediately following the special subframe are always allocated for the uplink transmission.

Table 2 shows a method for configuring the DwPTS, the GP, and the UpPTS, which are considered in a 3GPP LTE system. $T_s$ represents a sampling time and may be calculated as 1/(15000*2048) (sec).

TABLE 2

| | Normal CP in DL | | | Extended CP in DL | | |
|---|---|---|---|---|---|---|
| | | UpPTS | | | UpPTS | |
| Special subframe configuration | DwPTS | Normal CP in UL | Extended CP in UL | DwPTS | Normal CP in UL | Extended CP in UL |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |

TABLE 2-continued

| | Normal CP in DL | | | Extended CP in DL | | |
| | | UpPTS | | | UpPTS | |
| Special subframe configuration | DwPTS | Normal CP in UL | Extended CP in UL | DwPTS | Normal CP in UL | Extended CP in UL |
| --- | --- | --- | --- | --- | --- | --- |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

9 different special subframe configurations are available in case of a normal CP, and 6 different special subframe configurations are available in case of an extended CP.

As described above, in a TDD communication system, a specific subframe may be shifted (or changed) to a downlink subframe or an uplink subframe in accordance with time. In case of shifting from an uplink subframe to a downlink subframe, a guard period for the subframe shifting is not required. However, in case of shifting from a downlink subframe to an uplink subframe, a guard period is required. This is because, when performing uplink transmission, each user equipment performs Timing Advance (TA) in order to establish uplink synchronization. Therefore, if a guard period does not exist, the period during which the user equipment receives a downlink signal may overlap with the period during which the user equipment receives an uplink signal.

Since a signal cannot be transmitted or received during the guard period, if an uplink subframe is frequently positioned in succession (or after) a downlink subframe, an overhead of the guard period increases. Therefore, in order to reduce the overhead of the guard period, the application of a method of contiguously (or consecutively) aligning downlink subframes and then contiguously (or consecutively) aligning uplink subframe afterwards is required. For example, in an LTE system, one guard period or two guard periods are positioned among 10 subframes, and downlink subframes or uplink subframes are contiguously aligned between the guard periods. In a cellular communication system, wherein the base station manages scheduling, in case uplink subframes are contiguously aligned, the scheduling of the uplink subframes is performed by a downlink subframe, which is positioned before the uplink subframes.

Hereinafter, a TDD radio frame structure for providing a high-reliability and low-latency service will be described.

For a conventional TDD radio frame structure designed to provide a mobile broadband service, a BS determines the configuration of the TDD radio frame structure according to the ratio of downlink traffic to uplink traffic. However, when a high-reliability and low-latency service is provided, a wireless device always needs to be able to transmit a response signal (e.g., an ACK/NACK) to a received signal in time. Therefore, the wireless device needs to adjust an interval between a downlink subframe and an uplink subframe in a configuration so as to transmit the response signal at an appropriate time. Accordingly, in order to flexibly provide a mobile broadband service and a high-reliability and low-latency service using one TDD radio frame structure, the configuration of a TDD radio frame structure needs to be determined in view of the ratio of downlink traffic to uplink traffic and an interval between a downlink subframe and an uplink subframe in a configuration. The present invention proposes an efficient signaling technique for determining the configuration of a TDD radio frame structure in consideration of the foregoing two characteristics.

In order to provide a high-reliability and low-latency service, it is important to mitigate inter-cell interference. In a communication system using a TDD radio frame structure, each cell may arbitrarily adjust the number of downlink subframes and uplink subframes disposed in a TDD radio frame structure. When a neighboring cell applies an uplink subframe at the time when a cell applies a downlink subframe, a cell-edge UE receiving a downlink signal may receive huge interference by an uplink signal of a UE in the neighboring cell. Such interference reduces not only the transmission rate but also the reliability of the received signal. Since a high-reliability and low-latency service generally requires a very high reliability of 99.999%, it is important to eliminate such interference. The present invention proposes a technique for limiting subframes at particular positions to a downlink subframe and an uplink subframe in order to efficiently eliminate interference.

That is, the present invention proposes a technique for preventing downlink and uplink interference between neighboring cells in a TDD radio frame structure when a high-reliability and low-latency service is provided. Further, according to the technique proposed in the present invention, the number of subframes may be arbitrarily adjusted depending on the amount of downlink traffic and uplink traffic in a cell. In addition, according to the technique proposed in the present invention, the maximum interval between a transmission subframe for a received signal and a subframe for a feedback on a response signal may be kept constant for a high-reliability and low-latency service.

Figure 8:
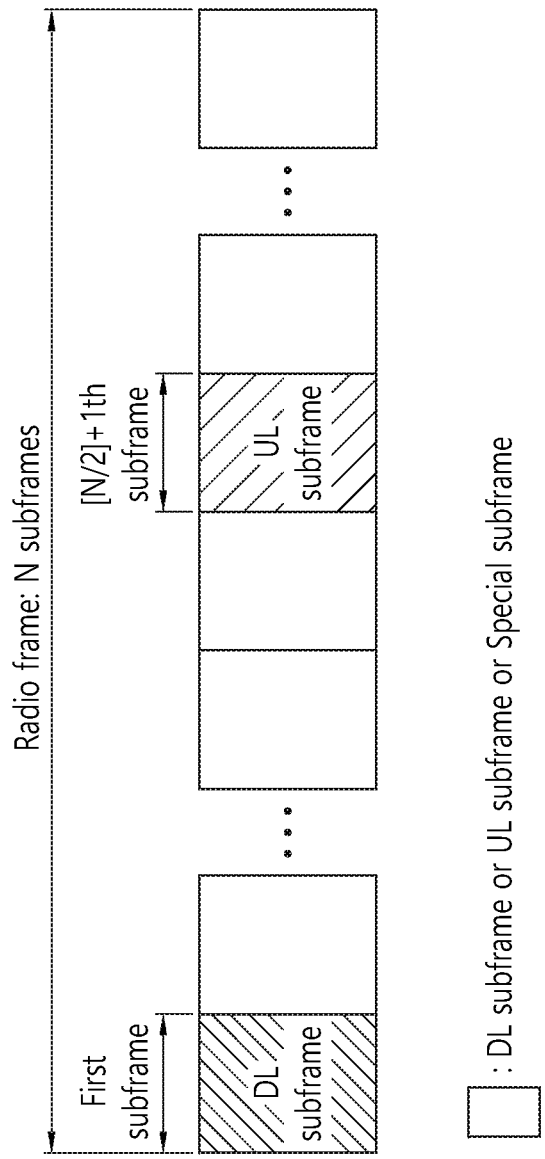
FIG. 8 shows an example of a TDD radio frame structure according to an embodiment of the present invention.

FIG. 8 shows an example of a TDD radio frame structure according to an embodiment of the present invention.

A TDD radio frame structure according to the present invention is shown in FIG. 8. One radio frame includes N subframes in total. In the radio frame, the first subframe is a downlink subframe, and the [N/2]+1th subframe is an uplink subframe. The other subframes may be freely assigned as a downlink subframe, an uplink subframe, or a special subframe. According to the proposed TDD frame structure, at least one downlink subframe and at least one uplink subframe that do not receive downlink and uplink interference are necessarily disposed in one radio frame. That is, the first subframe is fixed as a downlink subframe and the [N/2]+1th subframe is fixed as an uplink subframe in one radio frame for each cell, and thus downlink and uplink interference do not occur to these subframes.

For example, it may be assumed that N=8 and the subframe has a length of 0.1 ms. In this case, the radio frame has a length of 0.8 ms, and an uplink subframe is disposed in the fifth subframe in the radio frame. Assuming that the encoding processing time is 0.1 ms and the decoding processing time is 0.15 ms, the average time taken for a receiver to recover data is an average frame alignment time of the proposed TDD radio frame structure of 0.4 ms plus a subframe transmission time of 0.1 ms, which is 0.8 ms in total. This value satisfies a wireless transmission delay of 1 ms in a next-generation wireless communication system.

In the proposed TDD radio frame structure, since subframes can be freely allocated except for the first subframe and the [N/2]+1th subframe, various TDD configurations may be realized. Table 3 below shows illustrative configurations of a TDD radio frame structure where N=8.

TABLE 3

| DL-UL configuration | Subframe index | | | | | | | |
|---|---|---|---|---|---|---|---|---|
| | 0 | 1 | 2 | 3 | 4 | 5 | 6 | 7 |
| 0 | D | S | U | U | U | U | U | U |
| 1 | D | D | S | U | U | U | U | U |
| 2 | D | D | D | S | U | U | U | U |
| 3 | D | D | D | S | U | U | U | D |
| 4 | D | D | D | S | U | U | D | D |
| 5 | D | D | D | S | U | D | D | D |

In Table 3, D denotes a downlink subframe, U denotes an uplink subframe, and S denotes a special subframe. The configurations of downlink and uplink subframes (DL-UL configuration) of the TDD radio frame structure may be transmitted via higher-layer signaling or physical-layer signaling.

In addition to signaling for determining the ratio between downlink subframes and uplink subframes in a radio frame, signaling for determining the configuration of downlink and uplink subframes (DL-UL configuration) for providing a high-reliability and low-latency service may be used. Table 4 below shows illustrative configurations of a TDD radio frame structure for a high-reliability and low-latency service.

TABLE 4

| High-reliability and low-latency TDD configuration | Subframe index | | | | | | | |
|---|---|---|---|---|---|---|---|---|
| | 0 | 1 | 2 | 3 | 4 | 5 | 6 | 7 |
| 0 | D | | | | U | | | |
| 1 | D | D | | | U | U | | |
| 2 | D | D | D | | U | U | U | |
| 3 | D | D | D | S | U | U | U | U |

A high-reliability and low-latency service is determined on the basis of the quality of service (QoS) of a UE connected to a system that meets a wireless transmission delay of 1 ms. In the configurations of the TDD radio frame structure for the high-reliability and low-latency service in Table 4, downlink subframes and uplink subframes may be symmetrically arranged with respect to the intermediate subframe. Blanks in Table 4 are sections not defined for the high-reliability and low-latency TDD configurations. That is, the blanks may be sections not indicated by an indicator indicating a high-reliability and low-latency TDD configuration. These sections may be determined according to the configurations of downlink and uplink subframes (DL-UL configuration) in Table 3.

For example, Table 5 shows a configuration of downlink and uplink subframes finally determined according to the high-reliability and low-latency TDD configuration when the configuration of downlink and uplink subframes (DL-UL configuration) is 0 in Table 3.

TABLE 5

| DL-UL configuration | High-reliability and low-latency TDD configuration | Subframe index | | | | | | | |
|---|---|---|---|---|---|---|---|---|---|
| | | 0 | 1 | 2 | 3 | 4 | 5 | 6 | 7 |
| 0 | 0 | D | S | U | U | U | U | U | U |
| 0 | 1 | D | D | S | U | U | U | U | U |
| 0 | 2 | D | D | D | S | U | U | U | U |
| 0 | 3 | D | D | D | S | U | U | U | U |

In another example, Table 6 shows a configuration of downlink and uplink subframes finally determined according to the high-reliability and low-latency TDD configuration when the configuration of downlink and uplink subframes (DL-UL configuration) is 4 in Table 3.

TABLE 6

| DL-UL configuration | High-reliability and low-latency TDD configuration | Subframe index | | | | | | | |
|---|---|---|---|---|---|---|---|---|---|
| | | 0 | 1 | 2 | 3 | 4 | 5 | 6 | 7 |
| 0 | 0 | D | D | D | S | U | U | D | D |
| 0 | 1 | D | D | D | S | U | U | D | D |
| 0 | 2 | D | D | D | S | U | U | U | D |
| 0 | 3 | D | D | D | S | U | U | U | U |

In the examples of Tables 5 and 6, when the configurations of downlink and uplink subframes (DL-UL configuration) in Table 3 conflict with the high-reliability and low-latency TDD configurations in Table 4, the high-reliability and low-latency TDD configurations are preferentially applied. That is, in Table 5 and 6, D, S, and U in bold type are determined according to Table 4, and D, S, and U in normal type are determined according to according to Table 5.

The present invention proposes the following details with respect to the aforementioned TDD radio frame structures.

1. A configuration of a TDD radio frame structure is divided into indicator 1 to determine the ratio between downlink subframes and uplink subframes in a radio frame and indicator 2 to indicate a configuration of downlink subframes and uplink subframes for a high-reliability and low-latency service. Alternatively, indicator 2 may be an indicator to restrict some configurations of a radio frame structure for a high-reliability and low-latency service. The configuration of downlink subframes and uplink subframes indicated by indicator 1 is determined according to the ratio between downlink traffic and uplink traffic. The configuration of downlink subframes and uplink subframes indicated by indicator 2 is set to receive a high-reliability and low-latency service. A UE receives indicator 1 and indicator 2 from a BS.

Here, the ratio between downlink subframes and uplink subframes indicated by indicator 1 is information for increasing resource utilization efficiency, which is not urgent. On the contrary, the configuration of subframes for a high-reliability and low-latency service indicated by indicator 2 needs to be urgently transmitted. When indicators 1 and 2 are integrated and transmitted for a long period, it is impossible to quickly change the configuration of subframes for providing a high-reliability and low-latency service. However, when indicators 1 and 2 are integrated and transmitted with frequency for a short period, signaling overheads increase.

Also, when a first cell of two neighboring cells (first cell and second cell) transmits a downlink subframe and a second cell transmits an uplink subframe at the same time, a UE receiving the downlink subframe may experience huge interference due to the transmission of the uplink subframe of the second cell. In order to prevent such interference, a technique for determining a configuration for a TDD radio frame via the exchange of information between neighboring cells may be applied. It is possible to determine a configuration for a TDD radio frame by exchanging only indicator 2 among indicator 1 and indicator 2 mentioned above between neighboring cells, thus reducing signaling overheads. Alternatively, it is possible to reduce signaling overheads by exchanging indicator 2 for a short period and exchanging indicator 1 for a long period.

2. Indicator 1 and indicator 2 may be transmitted to the UE via higher-layer signaling or physical-layer signaling. In addition, the transmission frequencies of indicator 1 and indicator 2 may be adjusted to be different from each other. Specifically, the BS may transmit indicator 2 with high urgency more frequently than indicator 1.

Here, the ratio between downlink subframes and uplink subframes indicated by indicator 1 is information for increasing resource utilization efficiency, which is not urgent. On the contrary, the configuration of subframes for a high-reliability and low-latency service indicated by indicator 2 needs to be urgently transmitted. When indicators 1 and 2 are integrated and transmitted for a long period, it is impossible to quickly change the configuration of subframes for providing a high-reliability and low-latency service. However, when indicators 1 and 2 are integrated and transmitted with frequency for a short period, signaling overheads increase.

3. When indicator 2 is transmitted via physical-layer signaling, indicator 2 may be transmitted via the foremost downlink subframe of a radio frame. Here, indicator 2 may be transmitted via the last subframe including a downlink symbol. Alternatively, indicator 2 may be transmitted via the last subframe including a downlink symbol among subframes preceding the intermediate subframe of a radio frame. Alternatively, indicator 2 may be transmitted via a downlink symbol in a special subframe. When there are two or more special subframes in a radio frame, indicator 2 may be transmitted via one of the special subframes. Indicator 2 may be transmitted via the foremost downlink symbol of a radio frame. Further, when indicator 2 is transmitted twice in a radio frame, indicator 2 transmitted at the second time in a previous radio frame and indicator 2 transmitted at the first time in a next radio frame may have the same information.

When indicator 2 is transmitted in the foremost subframe of a radio frame, the UE may utilize just changed configuration information for the same radio frame. Also, when an uplink subframe in a previous radio frame is changed to a downlink subframe, the UE may obtain processing time for not performing uplink transmission. When indicator 2 is transmitted via the foremost downlink symbol, this advantage may be maximized When indicator 2 is transmitted once more in the middle of the radio frame, the reliability of indicator 2 is increased or the frequency of changing indicator 2 is increased, thereby stably applying a high-reliability and low-latency service. When indicator 2 is transmitted twice with the same information, the UE may combine signals received twice, thereby obtaining a received signal gain and a diversity gain. When indicator 2 is transmitted twice with different pieces of information, a network may quickly secure radio resources for a high-reliability and low-latency service.

To obtain sufficient processing time after receiving indicator 2, indicator 2 may be restricted to be transmitted only at the midpoint of a radio frame or before the midpoint of the radio frame.

Although a configuration of downlink and uplink subframes (DL-UL configuration) of the following radio frame is expected to be configuration of downlink and uplink subframes (DL-UL configuration) 0 in Table 3, the configuration may be suddenly changed to another configuration. Here, since there is only one subframe between the foremost subframe and an uplink subframe in the radio frame, if indicator 2 is transmitted only in the foremost subframe, it is difficult to cancel a resource previously scheduled for the uplink subframe. To prevent this problem, it is necessary that indicator 2 transmitted at the second time in the radio frame includes information on the configuration of the following radio frame.

4. The position of a special subframe in a configuration may be determined on the basis of a combination of indicator 1 and indicator 2. Using this technique may reduce signaling overheads. This technique is applied for the following reason. A downlink subframe may be disposed before a special subframe, and an uplink subframe may be disposed after the special subframe, because the special subframe has a guard period required for switching from downlink communication to uplink communication. Therefore, when the positions of downlink subframes and uplink subframes in a radio frame are determined through indicator 1 and indicator 2, the position of a special subframe may be naturally determined.

5. The UE may preferentially apply the information of indicator 2 when the information of indicator 1 conflicts with the information of indicator 2. Generally, a high-reliability and low-latency TDD configuration transmitted via indicator 2 is characterized as being more urgent and important than a configuration of downlink and uplink subframes (DL-UL configuration) transmitted via indicator 1. Therefore, it is preferable to preferentially follow the configuration determined by indicator 2.

6. The information of indicator 2 is exchanged between neighboring cells, while the information of indicator 1 is not exchanged between the neighboring cells. Alternatively, the information of indicator 2 may be exchanged more frequently than the information of indicator 1.

When a first cell of two neighboring cells (first cell and second cell) transmits a downlink subframe and a second cell transmits an uplink subframe at the same time, a UE receiving the downlink subframe may experience huge interference due to the transmission of the uplink subframe of the second cell. In order to prevent such interference, a technique for determining a configuration of a TDD radio frame via the exchange of information between neighboring cells may be applied. It is possible to determine a configuration of a TDD radio frame by exchanging only indicator 2 among indicator 1 and indicator 2 mentioned above between neighboring cells, thus reducing signaling overheads. Alternatively, it is possible to reduce signaling overheads by exchanging indicator 2 for a short period and exchanging indicator 1 for a long period.

7. In a configuration indicated by indicator 2, the maximum allocation period of downlink subframes may be set to be equal to the number of subframes in a radio frame. For example, a case may be considered where the number of subframes in a radio frame is 10 when a high-reliability and low-latency configuration in Table 4 is used. It may be assumed that the maximum allocation period of downlink subframes is different from the number of subframes, and that the maximum allocation period of downlink subframes in the high-reliability and low-latency configuration is eight. In this case, there may be one downlink subframe in one radio frame, whereas two downlink subframes may be disposed in another radio frame. Then, even if receiving the same indicator, radio frames may have different numbers of downlink subframes, making it is difficult to adjust a desired ratio between downlink subframes and uplink subframes. Therefore, in a configuration indicated by indicator 2, the maximum allocation period of downlink subframes may be set to be equal to the number of subframes in a radio frame.

8. When a high-reliability and low-latency service is provided, at least one downlink subframe and at least one uplink subframe may be disposed in a radio frame. Here, the radio frame may have a structure in which the maximum interval between the downlink subframe and the uplink subframe may be equal to half of the number of subframes in the radio frame or may be one subframe.

By disposing one or more downlink subframes and one or more uplink subframes, in a radio frame having N subframes, an ACK/NACK of a downlink transmission signal and an uplink transmission signal can be transmitted within the N subframes. When the interval between the downlink subframe and the uplink subframe is [N/2], it is possible to transmit an ACK/NACK of a downlink transmission signal and an uplink transmission signal within [N/2] subframes.

9. When the last subframe in a radio frame is an uplink subframe in a high-reliability and low-latency TDD configuration, an Mth subframe of the following radio frame may be limited to a downlink subframe or a special subframe including a downlink symbol. Here, M denotes the number of subframes taken to decode uplink data and to encode ACK/NACK information.

In a high-reliability and low-latency service, when uplink data is transmitted via the last subframe of a radio frame, it is necessary to transmit an ACK/NACK signal of the data via the following radio frame without delay. To this end, a downlink subframe for transmitting the ACK/NACK signal needs to be disposed in the following radio frame in consideration of the time to decode the uplink data and the time to encode the ACK/NACK signal. Generally, M denotes three or fewer subframes.

Hereinafter, a method of performing communication using a radio frame in a TDD-based wireless communication system according to an embodiment is described in detail.

First, according to the definitions of terms, a configuration of a downlink (DL) subframe and an uplink (UL) subframe denotes a configuration of subframes in a TDD-based radio frame.

A UE receives a first indicator indicating a first DL and UL subframe configuration for a radio frame and a second indicator indicating a second DL and UL subframe configuration for the radio frame. The first DL and UL subframe configuration may be set to a configuration according to the traffic ratio between DL and UL subframes (Table 3), and the second DL and UL subframe configuration may be set in a TDD configuration for receiving a high-reliability and low-latency service (Table 4).

Here, a first subframe of the radio frame may include at least one DL subframe, and a second subframe of the radio frame may include at least one UL subframe. That is, at least one DL subframe and at least one UL subframe may be fixedly disposed at particular subframe positions in the radio frame. When the radio frame includes N subframes, the first subframe is an initial subframe of the radio frame, and the second subframe is the [N/2]+1th subframe of the radio frame. That is, a DL subframe may be disposed in the first subframe of the radio frame, and a UL subframe may be disposed in the [N/2]+1th subframe of the radio frame. Here, the second indicator is received through the first subframe. When the second indicator is transmitted via the foremost subframe of the radio frame, the UE may utilize configuration information about the radio frame indicated by the second indicator. Also, the UE may obtain processing time for not performing uplink transmission accordingly.

The second indicator may be received once more via a third subframe after the first subframe and before the second subframe. When the second indicator is transmitted twice, the reliability of the second indicator may be increased or the frequency of changing the second indicator may be increased, thereby stably applying a high-reliability and low-latency service. The second indicator additionally received via the third subframe may indicate a fourth DL and UL subframe configuration for a radio frame following the radio frame. Accordingly, the second indicator transmitted at the second time in the radio frame indicates the configuration for the following radio frame, thus canceling a resource previously scheduled for a UL subframe of the following radio frame. Here, it is assumed that the interval between a DL subframe and a UL subframe in the radio frame is narrow.

The maximum allocation period of the DL subframe in the second DL and UL subframe configuration is set to be equal to the number of subframes in the radio frame. When the maximum allocation period of the DL subframe is equal to the number of subframes in the radio frame, radio frames can have the same number of DL subframes, thus adjusting a desired ratio between DL subframes and UL subframe according to the indicator.

The first and second indicators indicate that the at least one DL subframe is disposed in the first subframe and the at least one UL subframe is disposed in the second subframe for a serving cell. That is, as described above, the first and second indicators indicate that at least one DL subframe and at least one UL subframe are fixedly disposed at particular subframe positions in the radio frame. Here, the second indicator also indicates that at least one DL subframe is disposed in the first subframe and at least one UL subframe is disposed in the second subframe for a neighboring cell adjacent to the serving cell. That is, information on the second indicator is exchanged between neighboring cells, and at least one DL subframe and at least one UL subframe are fixedly disposed at the same particular subframe positions for the neighboring cells, thereby preventing interference in the UE. In other words, it is possible through the second indicator to secure a DL subframe and a UL subframe that do not cause interference between the serving cell and the neighboring cell.

The UE receives information on a third DL and UL subframe configuration for the radio frame indicated by the first and second indicators. The third DL and UL subframe configuration is first determined according to the second DL and UL subframe configuration indicated by the second indicator. Subsequently, a DL and UL subframe configuration not indicated by the second indicator in the third DL and UL subframe configuration is determined according to the first DL and UL subframe configuration indicated by the first indicator. That is, the configuration indicated by the second indicator is preferentially applied to the configuration indicated by the first indicator. Therefore, the second indicator may be received with a shorter period than the first indicator, thereby quickly changing a configuration of subframes for receiving a high-reliability and low-latency service.

The UE receives a downlink signal according to the determined third DL and UL subframe configuration. That is, communication may be performed by applying the third DL and UL subframe configuration to the radio frame.

The UE transmits an uplink signal according to the determined third DL and UL subframe configuration.

Here, the radio frame may be transmitted every TTI, and the DL and UL subframes may be transmitted every sTTI set to be shorter than the TTI. Accordingly, a radio transmission delay of 1 ms may be satisfied in receiving a signal and transmitting a response signal thereto.

Figure 9:
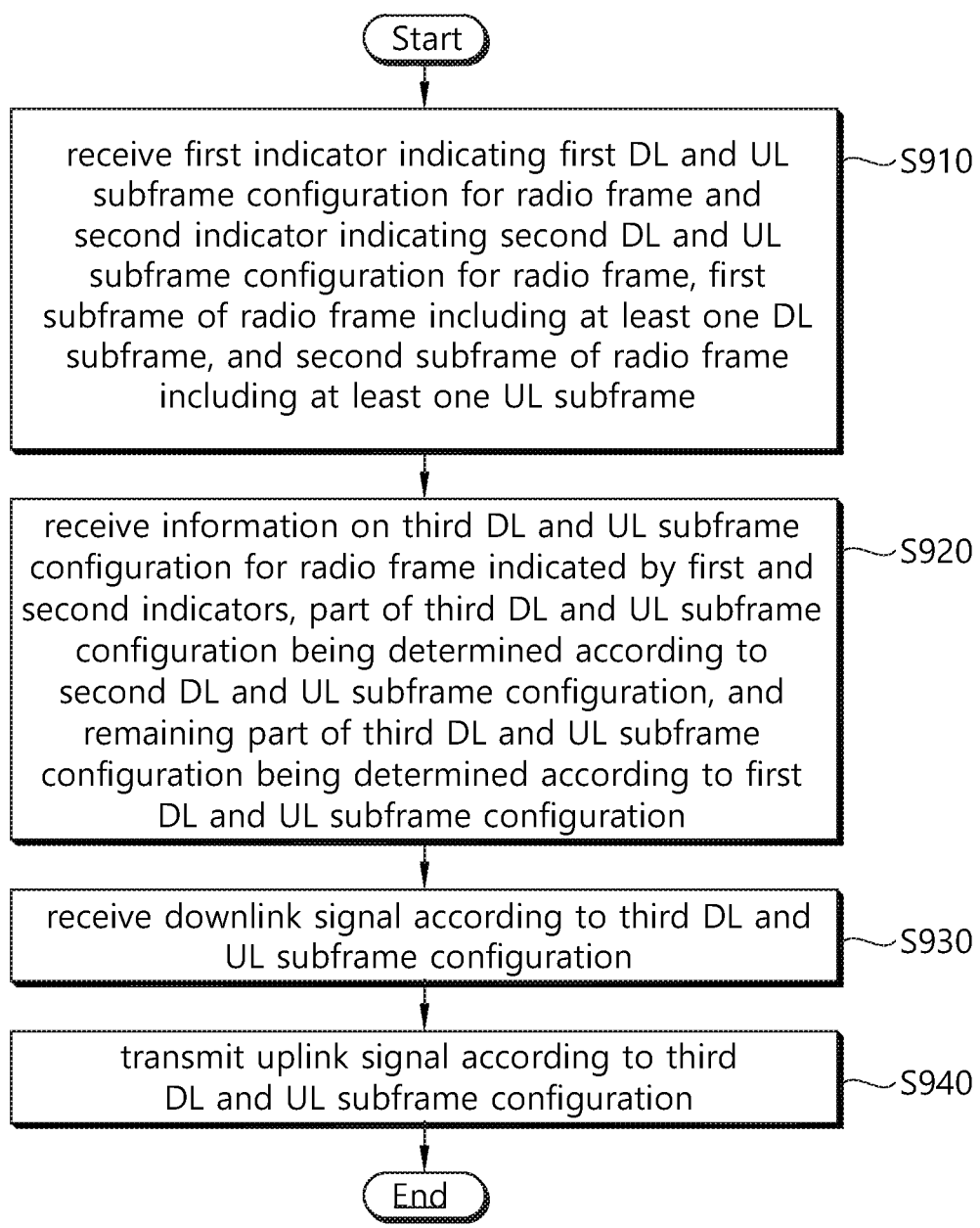
FIG. 9 is a flowchart showing a procedure for performing communication using a radio frame according to an embodiment of the present invention.

FIG. 9 is a flowchart showing a procedure for performing communication using a radio frame according to an embodiment of the present invention.

First, according to the definitions of terms, a configuration of a downlink (DL) subframe and an uplink (UL) subframe denotes a configuration of subframes in a TDD-based radio frame.

In step S910, a UE receives a first indicator indicating a first DL and UL subframe configuration for a radio frame and a second indicator indicating a second DL and UL subframe configuration for the radio frame. The first DL and UL subframe configuration may be set to a configuration according to the traffic ratio between DL and UL subframes, and the second DL and UL subframe configuration may be set in a TDD configuration for receiving a high-reliability and low-latency service.

Here, a first subframe of the radio frame may include at least one DL subframe, and a second subframe of the radio frame may include at least one UL subframe. That is, at least one DL subframe and at least one UL subframe may be fixedly disposed at particular subframe positions in the radio frame. When the radio frame includes N subframes, the first subframe is an initial subframe of the radio frame, and the second subframe is the [N/2]+1th subframe of the radio frame. That is, a DL subframe may be disposed in the first subframe of the radio frame, and a UL subframe may be disposed in the [N/2]+1th subframe of the radio frame. Here, the second indicator is received through the first subframe. When the second indicator is transmitted via the foremost subframe of the radio frame, the UE may utilize configuration information about the radio frame indicated by the second indicator. Also, the UE may obtain processing time for not performing uplink transmission accordingly.

In step S920, the UE receives information on a third DL and UL subframe configuration for the radio frame indicated by the first and second indicators. The third DL and UL subframe configuration is first determined according to the second DL and UL subframe configuration indicated by the second indicator. Subsequently, a DL and UL subframe configuration not indicated by the second indicator in the third DL and UL subframe configuration is determined according to the first DL and UL subframe configuration indicated by the first indicator. That is, part of the third DL and UL subframe configuration is determined according to the second DL and UL subframe configuration, and the remaining part of the third DL and UL subframe configuration is determined according to the first DL and UL subframe configuration. That is, the configuration indicated by the second indicator is preferentially applied to the configuration indicated by the first indicator. Therefore, the second indicator may be received with a shorter period than the first indicator, thereby quickly changing a configuration of subframes for receiving a high-reliability and low-latency service.

In step S930, the UE receives a downlink signal according to the determined third DL and UL subframe configuration. That is, communication may be performed by applying the third DL and UL subframe configuration to the radio frame.

In step S940, the UE transmits an uplink signal according to the determined third DL and UL subframe configuration.

Figure 10:
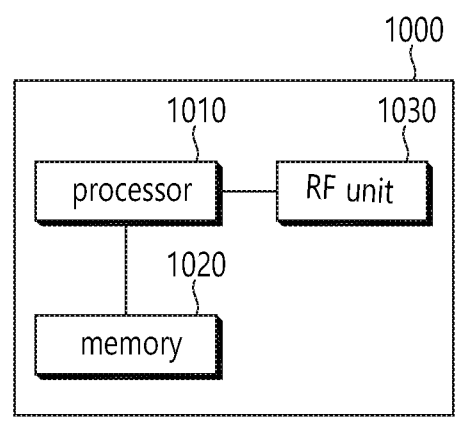
FIG. 10 is a block diagram showing an apparatus for wireless communication for implementing an embodiment of the present invention.

FIG. 10 is a block diagram showing an apparatus for wireless communication for implementing an embodiment of the present invention.

An apparatus 1000 for wireless communication includes a processor 1010, a memory 1020 and a radio frequency (RF) unit 1030.

The processor 1010 may be configured to implement proposed functions, procedures and/or methods described in this description. Layers of the radio interface protocol may be implemented in the processor 1010. The processor 1010 may handle a procedure explained above. The memory 1020 is operatively coupled with the processor 1010, and the RF unit 1030 is operatively coupled with the processor 1010.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. The RF unit 1030 may include baseband circuitry to process radio frequency signals. When the embodiments are implemented in software, the techniques described herein can be implemented with modules (e.g., procedures, functions, and so on) that perform the functions described herein. The modules can be stored in memory 1020 and executed by processor 1010. The memory 1020 can be implemented within the processor 1010 or external to the processor 1010 in which case those can be communicatively coupled to the processor 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

Furthermore, the technical concepts in the described embodiments may be identically applied, and embodiments in which the number of subframes and the number of special symbols within a radio frame are differently defined may be included in the technical scope of this specification.

What is claimed is:

1. A method for performing communication using a radio frame comprising at least one downlink (DL) subframe and at least one uplink (UL) subframe in a wireless communication system, the method comprising:
receiving a first indicator indicating a first DL and UL subframe configuration for the radio frame and a second indicator indicating a second DL and UL subframe configuration for the radio frame;
receiving information on a third DL and UL subframe configuration for the radio frame determined by the first and second indicators, part of the third DL and UL subframe configuration being determined according to the second DL and UL subframe configuration, and a remaining part of the third DL and UL subframe configuration being determined according to the first DL and UL subframe configuration;
receiving a downlink signal according to the determined third DL and UL subframe configuration; and
transmitting an uplink signal according to the determined third DL and UL subframe configuration,
wherein the radio frame comprises N subframes, a first subframe of the radio frame is a DL subframe, a second subframe of the radio frame is a UL subframe, the first subframe is an initial subframe of the radio frame, and the second subframe is an [N/2]+1th subframe of the radio frame.

2. The method of claim 1, wherein the first and second indicators indicate that a radio frame for a serving cell comprises the at least one DL subframe and the at least one UL subframe, and
the second indicator indicates that a radio frame for a neighboring cell adjacent to the serving cell comprises the at least one DL subframe and the at least one UL subframe.

3. The method of claim 1, wherein the second indicator is received through the first subframe.

4. The method of claim 3, wherein the second indicator indicates the second DL and UL subframe configuration for the same radio frame through which the second indicator is received.

5. The method of claim 3, wherein the second indicator is additionally received via a third subframe after the first subframe and before the second subframe.

6. The method of claim 5, wherein the second indicator additionally received via the third subframe indicates a fourth DL and UL subframe configuration for a radio frame following the radio frame.

7. The method of claim 1, wherein the second indicator is received with a shorter period than the first indicator.

8. The method of claim 1, wherein the first DL and UL subframe configuration is set according to a ratio between DL traffic and UL traffic, and the second DL and UL subframe configuration is set for receiving a high-reliability and low-latency service.

9. The method of claim 1, wherein a maximum allocation period of the DL subframe in the second DL and UL subframe configuration is set to be equal to a number of subframes in the radio frame.

10. A user equipment (UE) for performing communication using a radio frame comprising at least one downlink (DL) subframe and at least one uplink (UL) subframe in a wireless communication system, the UE comprising:
a radio frequency (RF) unit that transmits and receives a radio signal; and
a processor connected to the RF unit, wherein the processor is configured to:
receive a first indicator indicating a first DL and UL subframe configuration for the radio frame and a second indicator indicating a second DL and UL subframe configuration for the radio frame;
receive information on a third DL and UL subframe configuration for the radio frame determined by the first and second indicators, part of the third DL and UL subframe configuration being determined according to the second DL and UL subframe configuration, and a remaining part of the third DL and UL subframe configuration being determined according to the first DL and UL subframe configuration;
receive a downlink signal according to the determined third DL and UL subframe configuration; and
transmit an uplink signal according to the determined third DL and UL subframe configuration,
wherein the radio frame comprises N subframes, a first subframe of the radio frame is a DL subframe, a second subframe of the radio frame is a UL subframe, the first subframe is an initial subframe of the radio frame, and the second subframe is an [N/2]+1th subframe of the radio frame.

* * * * *